Figure 1:
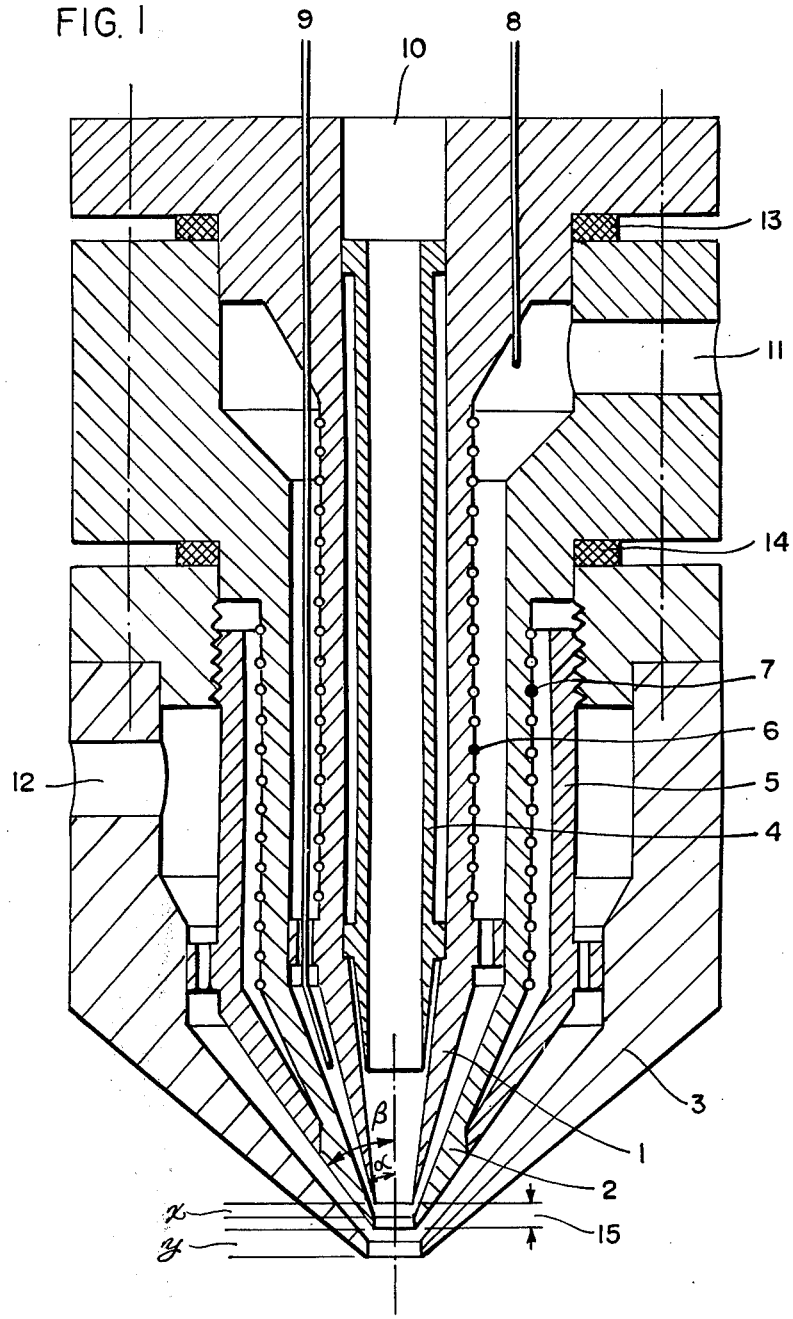

United States Patent
Urban et al.

[11] 3,937,772
[45] Feb. 10, 1976

[54] PRODUCTION OF MIXTURES OF PLASTICS MATERIALS

[75] Inventors: Friedrich Urban, Neuhofen; Oskar Buechner; Klaus Steigerwald, both of Ludwigshafen; Karl-Heinz Fauth, Frankenthal; Heinz Gehrig, Buerstadt, all of Germany

[73] Assignee: Badische Anilin- & Soda-Fabrik Aktiengesellschaft, Ludwigshafen (Rhine), Germany

[22] Filed: June 9, 1971

[21] Appl. No.: 151,392

[30] Foreign Application Priority Data
June 11, 1970 Germany............................ 2028751

[52] U.S. Cl.................. 264/12; 264/14; 264/140; 264/171; 264/349
[51] Int. Cl.²......................................... B29B 1/02
[58] Field of Search............ 264/12, 13, 14, 5, 349, 264/138, 140, 141, 171

[56] References Cited
UNITED STATES PATENTS

| | | | |
|---|---|---|---|
| 2,508,462 | 5/1950 | Marshall | 264/12 |
| 2,997,245 | 8/1961 | Nilsson et al. | 264/5 |
| 3,042,970 | 7/1962 | Terenzi | 264/14 |
| 3,166,613 | 1/1965 | Wright et al. | 264/12 |
| 3,441,468 | 4/1969 | Siggel et al. | 264/12 |
| 3,544,078 | 12/1970 | Stupakis | 264/12 |

*Primary Examiner*—Jeffery R. Thurlow
*Attorney, Agent, or Firm*—Johnston, Keil, Thompson & Shurtleff

[57] ABSTRACT

Production of a homogeneous mixture of plastics materials in powder form by subjecting a molten inhomogeneous mixture of two or more plastics to a maximum shear velocity of from $10^4$ to $10^8$ $sec^{-1}$ for from $10^{-2}$ to $10^{-6}$ seconds; the pulverulent mixtures obtained are used in rotary sintering and injection molding.

5 Claims, 5 Drawing Figures

INVENTORS:
FRIEDRICH URBAN
OSKAR BUECHNER
KLAUS STEIGERWALD
KARL-HEINZ FAUTH
HEINZ GEHRIG
BY

Johnston, Root, O'Keeffe, Keil, Thompson + Shurtleff
ATT'YS

PRODUCTION OF MIXTURES OF PLASTICS MATERIALS

This invention relates to a process for the production of mixtures of plastics materials. In this process an inhomogeneous plastics melt is subjected to high shear velocities for a short period. The plastics mixtures thus obtained are in powder form.

A number of methods for the preparation of plastics mixtures is known. It is particularly difficult, however, to produce homogeneous mixtures of thermoplastics and polyisobutylene, for example polyethylene/polyisobutylene mixtures. In one conventional process, for example, polyisobutylene is premilled on a two-roll mill for 10 minutes at from 110° to 120°C and then mixed with polyethylene. A homogeneous mixture is obtained after approximately 10 to 15 minutes.

In another conventional process the polyisobutylene is plasticized in a heated rubber kneader, and a specific amount of the charge is removed from the kneader either once or a number of times and is replaced each time by the same amount of granular polyethylene. A homogeneous mixture of polyisobutylene and polyethylene is thus eventually obtained.

German Pat. No. 1,288,293 discloses a process for the production of polyethylene/polyisobutylene mixtures in two stages, in which polyisobutylene is prekneaded for a short period in a cooled kneading apparatus and is then mixed therein with polyethylene so as to produce a masterbatch in which the proportion of polyisobutylene must be at least 50% by weight. This masterbatch is then comminuted and, in a second state, likewise prekneaded in a cooled kneading apparatus and diluted therein by the addition of polyethylene until the desired polyisobutylene concentration is achieved.

These conventional processes suffer from the drawback that polyisobutylene requires prekneading and that it is first necessary to prepare a masterbatch. Due to the high heat of friction generated during homogenization, it is necessary in one of the said processes to cool the polyisobutylene and the mixture of polyethylene and polyisobutylene to prevent degradation of the polyisobutylene. The prior art processes for the production of mixtures of polyethylene and polyisobutylene have the disadvantage that they require long homogenizing times so that the hourly throughputs which can be achieved with the apparatus are low.

It is an object of the invention to provide a simple process for the production of homogeneous mixtures of plastics materials, especially mixtures of polyethylene and polyisobutylene, in shorter times than have hitherto been possible.

We have found that this object is achieved by introducing an inhomogeneous plastics melt into a zone where it is subjected to a maximum shear velocity of from $10^4$ to $10^8$ sec$^{-1}$ for a period of from $10^{-2}$ to $10^{-6}$ seconds. The process of the invention is of particular interest where it is desired to prepare plastics mixtures which are difficult to produce by conventional methods, for example mixtures of (a) thermoplastic materials and (b) polyisobutylene, copolymers of isobutylene containing up to 10% by weight of polymerized units of 1,3-diolefins, and rubber.

The present process is primarily used for the production of polyethylene/polyisobutylene mixtures. In the process of the invention the polymers listed under (a) and (b) above may be mixed homogeneously in virtually all proportions, and mixtures of two or more thermoplastics may be prepared.

By thermoplastic materials or thermoplastics we mean polyolefins, polyamides, polyurethanes, polyesters and polymers of styrene, o-methylstyrene and α-methylstyrene. Particularly suitable polyolefins are the homopolymers of olefins having from 2 to 4 carbon atoms, such as polyethylene, polypropylene and polybutene-1. Suitable polyethylene has a density of from 0.915 to 0.960 g/cm$^3$, and suitable polypropylene has an intrinsic viscosity of from 0.5 to 8 dl/g (measured at 130°C in decahydronaphthalene). However, chlorinated polyethylene containing from 0.5 to 70% by weight of chlorine may also be used for the production of the plastics mixtures. Also suitable are copolymers of ethylene with butene-1 and copolymers of ethylene with other ethylenically unsaturated monomers such as vinyl esters of saturated aliphatic monocarboxylic acids of from 2 to 18 carbon atoms, vinyl ethers having from 3 to 12 carbon atoms and esters of unsaturated carboxylic acids such as acrylic and methacrylic esters derived from alcohols having from 1 to 8 carbon atoms, and polymers of ethylene and acrylic esters additionally containing from 91 to 30% by weight of free acrylic acid groups and/or methacrylic acid groups. The proportion of comonomers in the polymer may be up to 50% by weight of the total weight of the polymer. The melt index of the said polymers is usually between 0.1 and 100 g/10 min. (determined according to ASTM D 1238-57T).

Of the polymers listed under (b) above, polyisobutylene having a viscosity at 20°C of from 0.3 to $1.5 \times 10^{13}$, preferably from $10^6$ to $10^{11}$, poises is particularly suitable. Also suitable are copolymers of isobutylene containing up to 10% by weight of units of other ethylenically unsaturated compounds or 1,3-diolefins. Suitable comonomers are, for example, isoprene, styrene, chloroprene, pentadiene-1,3, butadiene-1,3, cyclopentadiene and dimethyl butadiene.

Figure 2:
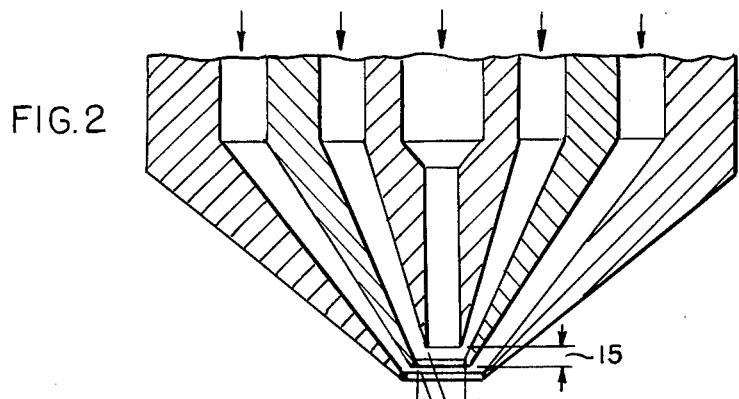
Figure 3:
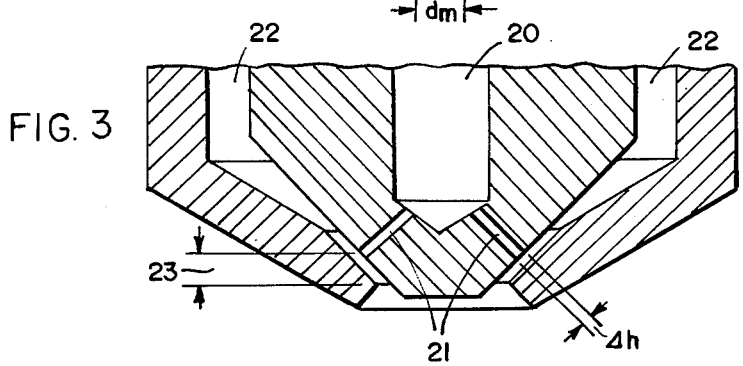
Figure 4:
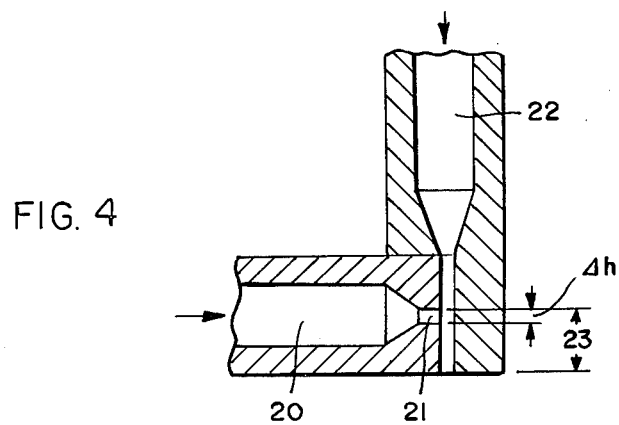
Figure 5:
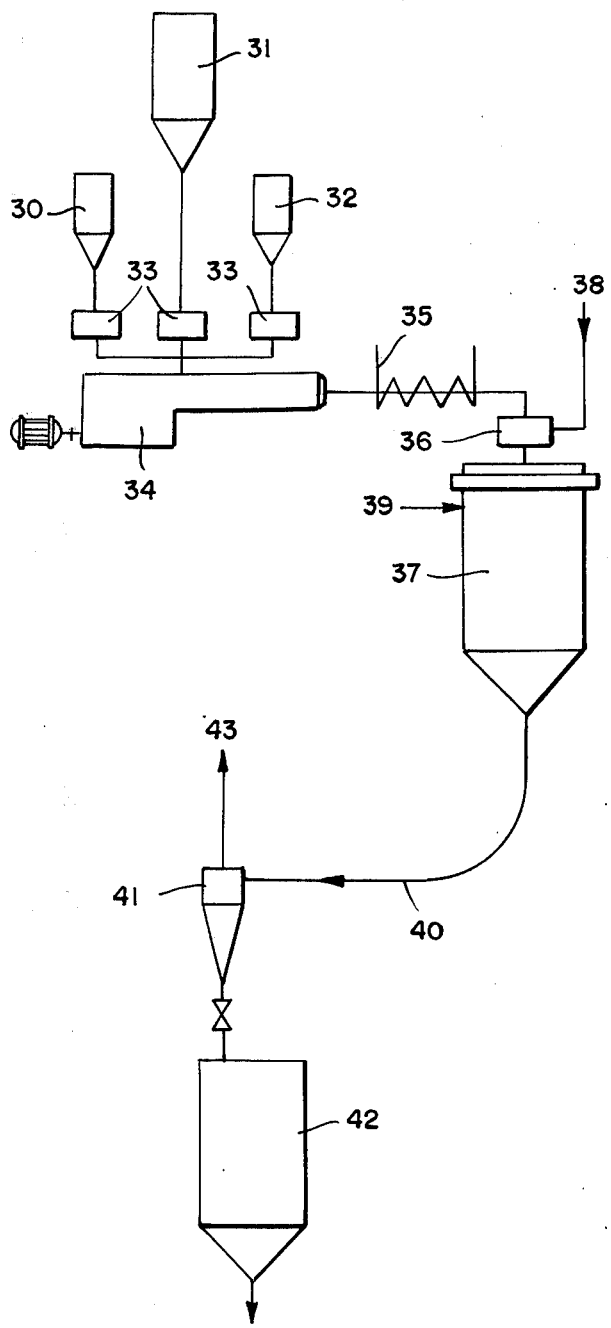

To carry out the process, the polymers from which a homogeneous mixture is to be made are fed in the form of an inhomogeneous melt to a device of the kind illustrated in FIGS. 1 and 3 of the accompanying drawings wherein FIGS. 1-4 are sectional views of the nozzles employed in the mixing devices of this invention and FIG. 5 being a diagrammatical illustration of the process of the invention. The temperature of the inhomogeneous melt is between the melting point of the polymer having the lowest melting point of all components of the mixture and the maximum temperature which may be used without causing chemical change in the polymers. This temperature range is generally between 100°C and 350°C, preferably between 150° and 250°C.

The mixing device shown in FIG. 1 consists essentially of three concentric nozzles. The atomizing (shearing) medium is passed through the inner gas nozzle 1 having a diameter of from 1 to 30 mm and through the outer gas nozzle 3 having an annular gap width of from 0.3 to 5 mm, preferably from 0.9 to 1.3 mm, at an angle $\beta$ of from to 15° to 70° to the nozzle axis, and the plastics material, which has been melted in an extruder, is passed through the product nozzle 2 having an annular gap width of from 0.2 to 3 mm at an angle $\alpha$ of from 5° to 40° to the nozzle axis, the said medium and the product being brought together in the orifice region of the threecomponent nozzle so that the inner gas stream impinges on the inner surface of the extruded tube of product at a distance $x$ of from 2 to 8 mm from the inner edge of the orifice of the product nozzle, whilst the outer edge of the orifice of the outer gas nozzle is at a distance $y$ of from 1 to 6 mm from the outer edge the orifice of the product nozzle. The inner sleeve 4 and the outer sleeve 5 serve to prevent the product from being unduly cooled by the gas streams, which are usually cooler. The inner nozzle heating means 6 and the outer nozzle heating means 7 serve to adjust or maintain the temperature so that the product is at its optimum mixing temperature. This temperature is monitored by means of thermocouples 8 and 9 located at the product nozzle inlet and at a point just upstream of the orifice of the product nozzle respectively. Gas is fed to the inner gas nozzle at 10, the product feed being at 11 and the outer gas inlet being at 12. The orifice cross section (gap width) of the product nozzle is adjusted by means of an appropriately dimensioned spacer ring 13 and the orifice gap width of the outer gas nozzle is adjusted by means of an appropriately dimensioned spacer ring 14. In the drawing the distances $x$ and $y$ indicate the upstream and downstream positions of the inner and outer gas nozzles respectively in relation to the product nozzle. The angle (cone angle) $\alpha$ of the product nozzle and the angle $\beta$ of the outer gas nozzle, both with reference to the common axis, are also shown in the drawing. Exact concentric alignment of the nozzles is ensured by centering collars on the cylindrical portions of the nozzles and the sleeves 4 and 5. So that the media can pass through said centering collars, the latter are provided with a number of bores or slots which may be inclined in the peripheral direction if it is desired to impart a twist to the flow of medium. The diameters of the individual bores in said collars are not critical, but the sum of the cross-sectional areas of the bores or slots in any one collar must be larger than the cross-sectional area of the associated annular nozzle gap, preferably a factor of from 1.2 to 4. If it is desired to impart a twist to the inner gas stream, a suitable deflecting member can be inserted at the inlet of the inner gas nozzle at 10.

In FIG. 1 the cone angle $\alpha$ of the product stream should be from 5° to 40°, preferably from 15° to 25°, with reference to the nozzle axis. The angle of twist employed to provide a tube which is even over its entire circumference may be from 0° to 60°, preferably from 15° to 45°. The dimensions of the extruded tube are within the following limits: internal diameter 1–30 mm, preferably 3–15 mm; wall thickness 0.2–3 mm, preferably 0.5–1.5 mm.

Preferred atomizing (shearing) media are air, inert gases or steam. The process is particularly economical when air is used as atomizing medium. If steam is used, the powder must be subsequently dried.

In FIGS. 1 and 2 the reference numeral 15 designates the zone in which the polymers are subjected to very high shear velocities for a short period. By shear velocity we mean the difference $\Delta V$ between the velocities of two layers flowing past each other divided by the distance $\Delta h$ separating the said layers in a direction perpendicular to the direction of flow, viz:

$$D = \frac{\Delta V}{\Delta h} [\text{sec}^{-1}] \quad (I)$$

where $\Delta V$ is the differential of the melt velocity. The melt velocity is calculated by dividing the throughput Q by the area F through which the melt emerges. The melt velocity in the region of the mixing zone' is between 1 and 200 m/sec, preferably between 10 and 120 m/sec. If, in equation I, $\Delta V$ is replaced by Q/F, and if F is replaced by the expression $$\pi \times d_m \times \Delta h \quad \text{II}$$

where $d_m$ is the mean diameter of the product nozzle and $\Delta h$ is the annular gap width, the following equation for calculating the maximum shear velocity D results:

$$D = \frac{Q}{\pi d_m (\Delta h)^2} [\text{sec}^{-1}] \quad (III).$$

Shear velocities, calculated according to equation III, required to produce homogeneous mixtures with the above-described apparatus are from $10^4$ to $10^8$ sec$^{-1}$ and preferably from $10^5$ to $10^7$ sec$^{-1}$. The residence time of the plastics melt in the shearing zone is calculated by dividing the length of the mixing zone 15 by the melt velocity; is is from $10^{-2}$ to $10^{-6}$, preferably from $10^{-4}$ to $10^{-6}$, seconds.

The inhomogeneous melt may also be homogenized using a device as shown in FIGS. 3 and 4. The temperature of the melt in the device should be between 100° and 350°C. The melt is fed to the device at the inlet 20 and is extruded through fine bores 21 in the form of strands. The melt may be extruded through one such fine bore 21, as illustrated in FIG. 4, or through a plurality of such fine bores 21, as shown in FIG. 3. A device as illustrated in FIG. 3 contains from 1 to 150 bores 21 arranged in a circle. The diameter of the individual bores is from 0.5 to 3 mm, preferably from 0.7 to 1.5 mm. A stream of gas impinges on the extruded strands approximately perpendicularly thereto, the velocity of the gas stream being from 100 to 750 m/sec, preferably from 300 to 450 m/sec. The temperature of the gas stream is from 10° to 350°C. The pressure of the gas in the feed lines 22 of the devices as shown in FIGS. 3 and 4 is from 2 to 120 atmospheres. Homogeneous mixing of the plastics materials takes place in the zone designated by 23. The length of the mixing zone 23 is from 0.5 to 5 mm. The area through which the melt emerges is calculated according to the equation $F = n\pi (\Delta h)^2$ where $n$ is the number of bores and $\Delta h$ is the diameter of one bore. Going on the same assumptions as used in calculating the maximum shear velocity for the device illustrated in FIG. 1, the maximum shear velocity D in the mixing zone of the devices illustrated in FIGS. 3 and 4 is calculated according to the following equation:

$$D = \frac{Q}{n \pi \times (\Delta h)^3} [\text{sec}^{-1}] \quad (IV).$$

Using equation IV, maximum shear velocities occurring in the region of the mixing zone 23 are calculated to be from $10^4$ to $10^8$ sec$^{-1}$. The residence times of the plastics melt in the mixing zone are from $10^{-2}$ to $10^{-6}$ seconds.

The process of the invention is diagrammatically illustrated in FIG. 5. The desired components of the plastics mixture are withdrawn from storage vessels 30, 31 and 32 either in the form of granules or a melt and are fed via metering means 33 to an extruder 34 which conveys the resulting inhomogeneous melt through a heated pipe 35 to a mixing unit 36. Alternatively, two plastics materials may be mixed with each other and, for example, with a stabilizer, by supplying a stabilizer from one of the storage vessel, say storage vessel 32, via metering means 33 to the extruder 34. The mixing unit 36 used is a device of one of the types illustrated in FIGS. 1, 3 and 4, located at the top of the large-capacity vessel 37. The required gas, preheated if necessary, is passed to the mixing unit 36 through line 38. The pulverulent plastics mixture leaving the mixing unit 36 may be cooled in the upper part of the vessel 37 by injecting cold air at 39. The pulverulent plastics mixture passes through line 40 to a separator 41. The pulverulent plastics mixture is collected in a bunker 42 and the gas used for mixing the plastics materials is allowed to escape through line 43.

The process of the invention enables high hourly throughputs to be achieved due to the short mixing times required. Under optimum conditions there is virtually no degradation of the plastics materials. A particular advantage of the process is that the mixtures are obtained in powder form. Pulverulant plastics are known to have a wide range of applications. The pulverulent plastics mixtures are used, for example, in rotary sintering and molding processes. The mixtures of plastics materials produced by the process of the invention are used, for example, as carpet backings and coatings on metal surfaces. Mixtures of polyethylene and polyisobutylene are primarily used for the manufacture of non-blocking sheeting.

The process of the invention is further illustrated by the following Examples.

EXAMPLE 1

Granular polyethylene having a density of 0.920 g/cm$^3$, a melt index (190°C/2.16 kg) of 1.7 g/10 min and a crystallite melting point of 108°C is supplied, together with granular polyisobutylene having a molecular weight of 100,000 (according to Staudinger) in a ratio of 1:1 by weight, to a single-screw extruder where they are melted and passed through an electrically heated pipe to a mixing device of the kind illustrated in FIG. 1. The hourly throughput is 200 kg. In the mixing device used, the distances $x$ and $y$ are both 3.5 mm, angle $\alpha$ is 17.5° and angle $\beta$ 37.5°. The temperature of the inner gas stream is 250°C and that of the outer gas stream 80°C. The thickness of the wall of the extruded tube is 1.2 mm. The ratio of the volume of the outer gas stream to that of the inner gas stream is 1.2:1, and the gas pressure is 50 atmospheres gauge. There is thus obtained a colorless powder containing 50% by weight of polyisobutylene. The density of the powder is 0.918 g/cm$^3$ according to DIN 53,479. The particule size distribution is as follows:

92% <500µ; 60% <300 µ; 16% <100µ.

| Properties of mixture | | determined by: |
|---|---|---|
| melt index (g/10 min) | 0.25 | MFI 190°/2.16kg ASTM-D-1238-65 T |
| density (g/cm$^3$) | 0.918 | DIN 53 479 |
| yield strength (kg/cm$^2$) | 35 | DIN 53 455 |
| elongation (%) | 500 | DIN 53 455 |
| modulus of elasticity (kg/cm$^2$) | 505 | DIN 53 455 |
| torsion modulus (dynes/cm$^2$) | 4.9×10$^8$ | DIN 53 455 |
| average particle size of polyisobutylene particles | 2-5 µ | electron microscope |

The resulting mixture is distinguished particularly by its excellent resistance to substances promoting environmental stresscracking.

The melt velocity in the mixing zone is calculated as follows:

$$\text{melt velocity } V = \frac{Q}{F} = \frac{Q}{\pi \times d_m \times \Delta h} = \frac{21.8 \times 10^7 \text{mm}^3}{3600 \text{ sec} \times 3.14 \times 6.5 \text{ mm} \times 0.1 \text{ mm}} = \frac{21.8 \times 10^7 \text{ mm}}{7.4 \times 10^3 \text{ sec}} = 2.95 \times 10^4 \text{ mm/sec}.$$

The residence time in the mixing zone is calculated as follows: (length of atomizing zone is assumed to be 1 mm)

$$\text{residence time} = \frac{1 \text{ mm}}{2.95 \times 10^4 \text{ mm/sec}} = 3.4 \times 10^{-5} \text{ sec}.$$

The maximum shear velocity D in the mixing zone is calculated as follows:

$$D = \frac{2 \times Q}{\pi \times d_m \times (\Delta h)^2} = \frac{4.36 \times 10^8 \text{ mm}^3}{3600 \text{ sec} \times 3.14 \times 6.5 \text{ mm} \times (0.1 \text{ mm})^2} = \frac{4.36 \times 10^8 \text{ mm}^3}{0.74 \times 10^3 \text{ sec}}$$

$$5.9 \times 10^5 \text{ sec}$$

EXAMPLE 2

Polyethylene having a density of 0.918 g/cm$^3$, a melt index of 0.30 g/10 min (190°C/2.16 kg), and a crystallite melting point of 104.5°C and polyisobutylene having a molecular weight of 130,000 according to Staudinger are fed to a single-screw extruder in a ratio of 9:1 by weight. They are melted in the extruder and extruded through an electrically heated pipe to a mixing device of the type illustrated in FIG. 1. The throughput is 300 kg/hr of melt. The extruded tube has an internal diameter of 6.5 mm and a wall thickness of 1.2 mm. The distances $x$ and $y$ are both 4 mm, the angle $\alpha$ is 17.5° and the angle $\beta$ 37.5°. The gas pressure is 50 atmospheres gauge and the temperature of both gas streams is 80°C, the ratio of the volume of the outer gas stream to that of the inner gas stream being 1.2:1. At a specific gas consumption of 4 m$^3$/kg (STP) there is obtained a powder having the following particle size distribution:

90% <500 µ; 64% <300 µ; 20% <100µ.

| Properties of mixture | | determined by |
|---|---|---|
| melt index (g/10 min) | 0.18 | MFI 190°C/2.16 kg ASTM-D-1238-65 T |
| density (g/cm³) | 0.916 | DIN 53 479 |
| tensile strength at yield (kg/cm²) | 100 | DIN 53 455 |
| tensile strength at break (kg/cm²) | 160 | DIN 53 455 |
| elongation (%) | 550 | DIN 53 455 |
| resistance to environmental stress-cracking (hrs) | 300 | ASTM-D-1693-66 |
| impact resistance (g) | 250 | ASTM-D-1709-67 |
| average particle size of polyisobutylene particles | 2–5 μ | electron microscope |

Using equation III, the maximum shear velocity is calculated to be $3 \times 10^6$ sec$^{-1}$. The residence time in the mixing zone is calculated by dividing the length of the mixing zone by the melt velocity; it is $2 \times 10^{-4}$ seconds.

There is obtained a pulverulent polyethylene/polyisobutylene mixture containing 10% by weight of polyisobutylene. Sheeting prepared from the powder has a blocking value (in g/cm²) of 0. The blocking value corresponds to the force required to separate two 40/μ thick sheets, which have been pressed together at 70°C under a pressure of 1 kg/cm², after the pressure has been released.

EXAMPLE 3

Polyethylene having a density of 0.918 g/cm³, a melt index of 17.8 g/10 min. (190°C/2.16 kg) and a crystallite melting point of 104.5°C is supplied, together with polyisobutylene having a molecular weight of 3000, a viscosity of 300 poises at 20°C and a density of 0.889 g/cm³, to a single-screw extruder in a ratio of 99:1 by weight. They are melted in the extruder and forced through an electrically heated pipe to a mixing device of the kind described in Example 1 and having a capacity of 200 kg/hr. There is obtained a polyethylene/polyisobutylene mixture containing 1% by weight of polyisobutylene.

| Properties of mixture | | determined by: |
|---|---|---|
| melting index (g/10 min) | 20.0 | MFI 190°C/2 kg ASTM-D-1238-65 T |
| density (g/cm³) | 0.9149 | DIN 53 479 |
| tensile strength at yield (kg/cm²) | 92 | DIN 53 455 |
| tensile strength at break (kg/cm²) | 100 | DIN 53 455 |
| elongation (%) | 210 | DIN 53 455 |
| blocking value (g/cm²) | 3.6 | |

Maximum shear velocity calculated according to equation III: $12 \times 10^5$ sec$^{-1}$; residence time; $9 \times 10^{-5}$ seconds.

EXAMPLE 4

In a single-screw extruder at 250°C, polypropylene having an intrinsic viscosity (measured at 130°C in decahydronaphthalene) of 3.2 dl/g and a density of 0.896 g/cm³ and polyisobutylene having a molecular weight of 100,000 according to Staudinger are melted in a ratio of 9:1 by weight and then mixed in the manner described in Example 1. There is obtained a polypropylene/polyisobutylene mixture containing 10% by weight of polyisobutylene. The pulverulent mixture is used for the manufacture of injection moldings.

| Properties of mixture | | determined by: |
|---|---|---|
| melt index (g/10 min) | 2.1 | MFI 190°C/2.16 kg ASTM-D-1238-65 T |
| density (g/cm³) | 0.8986 | DIN 53 479 |
| tensile strength at yield (kg/cm²) | 170 | DIN 53 455 |
| tensile strength at break (kg/cm²) | 153 | DIN 53 455 |
| elongation (%) | 250 | DIN 53 455 |
| resistance to environmental stress-cracking | 150 | ASTM-D-1693-66 |

Shear velocity calculated according to equation III: $0.2 \times 10^7$ sec$^{-1}$; residence time: $4 \times 10^{-4}$ seconds.

EXAMPLE 5

Polyethylene having a density of 0.946 g/cm³ and a melt index (190°C/20 kg) of 6.2 and polyisobutylene having a molecular weight of 200,000 according to Staudinger are fed to a single-screw extruder in a ratio of 7:3 by weight. They are melted in the extruder at 275°C and are then supplied to a mixing device of the kind described in Example 1 at a rate of 125 kg/hr. There is obtained a polyethylene/polyisobutylene mixture containing 30% by weight of polyisobutylene. The powder has the following particle size distribution:
99% <500μ; 75% <300μ; 25% <100μ.

The mixture has a melt index of 3.5 g/10 min according to ASTM-D-1238-65 T and a density of 0.9372 g/cm³ according to DIN 53,479. The mixture is used as a carpet backing.

EXAMPLE 6

An inhomogeneous mixture of 50% by weight of polystyrene having a density of 1.05 g/cm³ and a melt index (200°C/5 kg) of 9 and 50% of a copolymer consisting of 90% by weight of ethylene and 10% by weight of vinyl acetate and having a density of 0.936 g/cm³ and a melt index (190°C/2.16 kg) of 4 is melted in a single-screw extruder at 250°C and supplied to a mixing device of the type illustrated in FIG. 4 at a rate of 250 kg/hr. The inhomogeneous melt is forced through 42 bores having a diameter of 1 mm each and arranged in a circle. Using equation IV the maximum shear velocity is calculated to be $2.1 \times 10^6$ sec$^{-1}$. The length of the mixing zone (1 mm) divided by the melt velocity of 70 m/sec gives a residence time of $1.4 \times 10^{-5}$ seconds. There is obtained a homogeneous mixture having a modulus of elasticity according to DIN 53,457 of 6,000 kg/cm². This mixture is used as a flame-spraying powder. The particle size distribution is as follows:
97% <500μ; 85% <300μ; 30% <100μ.

EXAMPLE 7

An inhomogeneous mixture of 90% by weight of polyethylene having a density of 0.953 g/cm³ and a melt index (190°C/20 kg) of 2.0 and 10% by weight of polyisobutylene having a molecular weight of 100,000 according to Staudinger is melted in an extruder at 225°C and fed to a mixing device of the kind illustrated in FIG. 4. The inhomogeneous melt is forced through 10 bores having a diameter of 1 mm each and arranged in a circle. The throughput is 125 kg/hr and the shear velocity, calculated according to equation IV, is $5.3 \times 10^6$ sec$^{-1}$. The length of the mixing zone (2 mm) divided by the melt velocity of 110 m/sec gives a residence time of $1.8 \times 10^{-5}$ sec. There is obtained a polyethylene/polyisobutylene mixture containing 10% by weight of polyisobutylene. The powder has the following particle size distribution:

92% <500μ; 75% <300μ ; 24% <100μ.

| Properties of mixture | | determined by: |
| --- | --- | --- |
| melt index (g/10 min) | 0.9 | MFI 190°C/2.16 kg ASTM-D-1238-65 T |
| density (g/cm³) | 0.953 | DIN 53 479 |
| modulus of elasticity (kg/cm²) | 10,000 | DIN 53 457 |
| torsion modulus (dynes/cm²) | 5 × 10⁹ | DIN 53 455 |

We claim:

1. A process for the production of a pulverulent homogeneous mixture of plastic material which comprises:
   a. extruding a nonhomogeneous mixture of two or more plastic materials through a nozzle means,
      1. at a temperature between the melting point of the plastic material having the lowest melting point of all components of the mixture and the maximum temperature which may be used without causing a chemical change therein,
      2. at a nozzle speed of from 1 to 200 m/sec.,
      3. in an annular flow which tapers to a cone angle of from 5° to 40° which has an annular gap width of from 0.2 to 3 mm and an angle of twist from 0° to 60° to form a molten tube having an internal diameter of from 1 to 30 mm and a wall thickness of from 0.2 to 3 mm;
   b. exposing said extruded nonhomogeneous mixture of plastic materials to a gas or steam shearing medium which is divided into inner and outer streams to create a high shear velocity whereby a homogeneous mixture of plastic material is formed,
      1. said inner stream of gas or steam shearing medium having a diameter of from 1 to 30 mm and an elevated temperature sufficient to maintain said extruded nonhomogeneous mixture of plastic material in a molten state, said inner stream being so directed that it impinges upon the inner surface of said extruded tube of said nonhomogeneous mixture for a distance of from 2 to 8 mm before reaching the inner edge of the orifice of said product nozzle means,
      2. said outer stream of gas or steam shearing medium, flowing in an annular space which tapers to a cone angle of from 15° to 70° and having an annular gap width of from 0.3 to 5 mm at an elevated temperature sufficient to maintain said extruded nonhomogeneous mixture in a molten state so that said outer stream being so directed that it impinges upon the outer surface of said extruded tube for a distance of from 1 to 6 mm before exiting from said nozzle means, the volume of said outer stream to said inner stream being 1.2:1;
   c. said extruded nonhomogeneous mixture of plastic materials being subject to high shear velocities of from $10^4$ to $10^8$ sec$^{-1}$ for from $10^{-4}$ to $10^{-6}$ seconds by said inner and outer streams; and
   d. spraying the resultant pulverulent homogeneous mixture of plastic material and gas or steam shearing medium from the nozzle means into a cooling and collecting means.

2. A process as set forth in claim 1, wherein the inhomogeneous mixture consists of polyethylene having a density of from 0.915 to 0.960 g/cm³ and a polyisobutylene having a viscosity of from 0.3 to 1.5 × 10¹³ poises.

3. A process as set forth in claim 1, wherein the inhomogeneous mixture consists of polypropylene having an intrinsic viscosity of from 1.5 to 8 dl/g and polyisobutylene having a viscosity of from 0.3 to 1.5 × 10¹³ poises.

4. A process as set forth in claim 1, wherein the inhomogeneous mixture consists of polystyrene and a copolymer of ethylene and vinyl acetate.

5. A process as set forth in claim 1, wherein the inhomogeneous mixture consists of polyethylene having a density of from 0.915 to 0.960 g/cm³ and a copolymer of isobutylene with up to 10% by weight of a monomer selected from the group consisting of isoprene, styrene, chloroprene, 1,3-pentadiene, 1,3-butadiene, cyclopentadiene and dimethyl butadiene.

\* \* \* \* \*